United States Patent [19]

Colby et al.

[11] 4,438,146

[45] Mar. 20, 1984

[54] METHOD FOR PREPARING COOKED WHEAT PRODUCT

[75] Inventors: Ronald W. Colby, Peru, Ill.; Arnold Spicer, Santa Ponsa, Spain

[73] Assignee: New Generation Foods, Inc., Reno, Nev.

[21] Appl. No.: 358,789

[22] Filed: Mar. 16, 1982

[51] Int. Cl.³ ............................ A23L 1/18; A21D 8/00
[52] U.S. Cl. ..................................... 426/448; 426/449; 426/559; 426/625
[58] Field of Search ............... 426/448, 449, 516, 450, 426/559, 625

[56] References Cited

U.S. PATENT DOCUMENTS

| 2,120,138 | 6/1938 | Mathews et al. ................... 426/448 |
| 3,458,321 | 7/1969 | Reinhart et al. . |
| 3,682,652 | 8/1969 | Corbin et al. . |
| 3,703,379 | 11/1972 | Cummisford et al. ................ 99/81 |
| 3,753,729 | 8/1973 | Harms et al. ........................ 99/82 |
| 4,259,359 | 3/1981 | Spicer .................................. 426/62 |

Primary Examiner—Raymond N. Jones
Assistant Examiner—George C. Yeung
Attorney, Agent, or Firm—Fitch, Even, Tabin & Flannery

[57] ABSTRACT

Wheat producers and method for cooking such products are described, wherein the dough for such products is cooked by extrusion through an extrusion die.

12 Claims, 7 Drawing Figures

METHOD FOR PREPARING COOKED WHEAT PRODUCT

The present invention relates generally to wheat products and to a method for cooking such products. More particularly, the present invention relates to a cooked, edible product prepared from wheat which is in expanded form and which, in a preferred embodiment, is high in protein and may be in the form of a curl, or cylinder.

There are, of course, many products available in the food industry which are cooked and later expanded. Many pieces of equipment and processes have been devised to expand various food materials, particularly corn and rice, to provide several types of food products, such as cereals and snacks. The most common method for preparing expanded snack products is to first cook a dough and later extrude the cooked dough under pressure from a heated extruder. Expansion of gas or steam within the dough as it exits from the extruder from a zone of high pressure to a zone of low pressure results in the formation of an expanded food product. The retention of the expanded structure by the food product after emergence from the extruder is usually provided by setting of ingredients in the dough. In the past, it had not been generally thought possible to provide an expanded food product from dough compositions having a relatively high wheat protein content. High wheat protein levels have resulted in providing doughs which after emergence from the extruder and initial expansion, tend to revert to a more dense structure, i.e. do not set in a fully expanded condition.

It has been particularly difficult to effect expansion and desired texturization of doughs prepared from wheat having a high protein content. Attempts to produce expanded high protein wheat products have generally resulted in products which are tough in texture and unable to hold the initial expansion upon extrusion of the product.

Various attempts have been made to expand doughs prepared from high protein wheat so as to provide a light, crisp and tender texture. In this connection, various expansion aids, such as starch and leavening agents have been added to the dough prior to expansion. U.S. Pat. No. 3,851,081 to Epstein discloses the addition of a protein gel to effect desired expansion of various grain products upon extrusion. However, the attempts to provide an expanded food product from high protein wheat products have not been generally successful in achieving the desired expansion, crispness, tenderness, and mouth feel usually associated with commercially accepted expanded food products, such as "corn curls".

U.S. Pat. No. 4,259,359 to Spicer describes a successful high protein, whole wheat grain expanded food product. That product, however, is prepared by substantial working and cooking of the dough prior to extrusion with working and cooking being effected in sections of a barrel of an extruder device prior to the dough reaching a die where it is extruded at temperatures as high as 370° F. Such cooking and working are not required in the present invention so that substantial savings in energy can be achieved and improved control of the operations is possible.

For purposes of the present specification, the term "high protein wheat" is meant to include whole wheat grain containing at least 11 percent by weight of protein. It should be understood that reference to the protein content of the wheat is meant the protein content of the whole wheat grain and not to the protein content of flour derived from the endosperm of wheat grain from which the bran and germ have been removed. In the manufacture of wheat flour, the aim is separation of the endosperm of the grain from the bran and germ, followed by pulverizing it to very small particles. The pulverized endosperm is the product generally regarded as flour. The various steps involved in wheat flour production are wheat selection and blending, cleaning, conditioning or tempering, breaking, bolting or sieving, purification, reduction, and bleaching.

The composition of various cereal grains is set forth in Table I in U.S. Pat. No. 4,259,359 to Spicer issued Mar. 31, 1981 and such table is incorporated by reference as if full written herein.

Accordingly, it is a principal object of the present invention to provide an improved method for an expanded food product from wheat, and particularly high protein wheat, which is tender and crisp.

It is another object of the invention to provide a method for the preparation of a wheat product wherein dough primarily comprising ground wheat and moisture is mixed at ambient temperature and is extruded through a restricted die to effect cooking heating to steam conditions whereby expansion of the wheat product is achieved upon exiting from the die.

It is a further object of the invention to provide a process for making an expanded wheat product at reduced energy requirements and with improved control over the manufacture of the product.

A more particular object of the invention is the provision of a method for making an expanded wheat product from a dough primarily comprising high protein wheat and water.

An additional object of this invention is to establish a method for providing an expanded wheat product wherein cooking is principally effected by means of a die and without providing external heat to effect cooking.

These and other objects of the invention will be more particularly described in the following detailed description and accompanying drawings, of which:

Generally, the process of the present invention contemplates providing a whole wheat grain, preferably from high protein wheat, and grinding it to a particular degree and adding moisture to the wheat to provide a dough at a specified moisture level. Optionally an edible acid may be added to the dough. Also, an extrusion aid or lubricant may be added to the dough to modify the extrusion pressures. The preferred extrusion aid is an edible oil or fat which is added in a controlled amount to effect lubrication during extrusion and to provide the desired texture for the product. Moisture is added to the wheat in sufficient quantity to provide a doughlike consistency. The dough is mixed to achieve uniformity at ambient temperature and pressed through a die in which the dough reaches a temperature sufficient to generate steam in the dough. Extrusion provides a high protein, expanded wheat product, the expansion being achieved without the addition of heat from an external source. Because of steam vaporization upon extrusion, the die face is cooled so that the outer face of the die has a temperature of from about 150° F. to 180° F.

The endosperm proteins of wheat, called gluten, possess the peculiar and distinctive property of forming a visco elastic gel when wetted with water and worked for a period of time. In the process of the present invention, the dough is worked at ambient temperature sufficiently to achieve uniform distribution of moisture and any added ingredients. Through the action of the die, the dough reaches a steam developing temperature and then is extruded at a sufficient pressure and turbulence with the die head reaching a temperature of about 150° F. to 180° F. During the extrusion process, the dough reaches such temperature for such time that the gluten is elasticized and the wheat product expands upon exit from the die.

When used, the edible acid is present at a level of from about 0.01 to about 0.05 percent equivalent lactic acid based upon the weight of wheat. Preferably, the edible acid is present at a level of from about 0.02 to about 0.04 percent by weight equivalent lactic acid. All percentages used herein are by weight unless otherwise specifically indicated.

By the term "equivalent lactic acid" is meant that amount of a given edible acid which has the same acidifying equivalent as the specified amount of lactic acid. Suitable edible acids include, but are not limited to, lactic acid, phosphoric acid, hydrochloric acid, gluconic acid, acetic acid, succinic acid, adipic acid, fumaric acid, malic acid, citric acid, tartaric acid and mixtures thereof.

The edible acid may be provided by direct addition of food grade chemical acid. Alternatively, the edible acid may be supplied by use of an acid containing food product. Suitable acid containing food products include, but are not limited to cream cheese, cottage cheese, yogurt, whey, dried whey solids, acidic fruit juices such as orange juice, lemon juice, grapefruit juice, and pineapple juice and mixtures thereof.

Common salt, NaCl, and other salts, such as sodium dihydrogen phosphate and other phosphate salts may be present in the dough. When used, the salt is present at a level of from about 1.5 to 6 percent by weight of the dough. It is preferred, however, not to add salt to the dough other than the salts contributed by optional ingredients, such as whey.

It is important that the ingredients which are used be uniformly distributed throughout the wheat. The presence of high concentrations of any ingredient, including moisture, is undesirable.

Although this invention applies to products made primarily from wheat, generally, it is particularly advantageous in producing a high protein wheat product. The high protein wheat used in the present invention should have at least 11 percent protein. Various grades of wheat can be mixed to provide a wheat having the desired 11 percent protein. In this connection, at least 7 classes of wheat are recognized and these various classes of wheat can be mixed to provide a wheat having at least 11 percent protein. In an average year, the median protein content of hard-wheat produced in different areas will range from 11 to 15 percent. Soft-wheat will generally average from about 6 to about 11 percent protein. Soft and hard wheats can be mixed to provide the desired 11 percent protein wheat. Also, a wheat can be fortified with gluten or other protein to achieve the desired protein level.

For nutrition, the wheat can be fortified with other protein materials such as albumen, yeast, isolated soy protein, casein, wheat germ, bran, and cracked wheat to increase the protein level of the product above that provided by the wheat alone. However, it should be understood that the added protein may not provide the body and texture of the expanded product of the invention and may impair or weaken the structure of the product. The added protein materials, when used, are primarily present for nutrition. The added protein materials, when used, are present at a level of from about 5 to about 20 percent based on the weight of the wheat.

The preferred extrusion aid is a triglyceride fat. The fat can be any of the various liquid and solid fats normally used in food manufacture. The fat can also be provided by a fat containing material or other additive, such as yogurt, milk or cream. In a preferred embodiment, yogurt, containing some fat and acid, is added to the dough to provide moisture, fat and acid as well as additional nutrition to the system. Flavoring and coloring ingredients can be added to provide desired taste and appearance to the final product.

As indicated, the process of the present invention begins with whole wheat, or a mixture of various types of whole wheat, preferably having a protein content of at least 11 percent. The whole wheat should be ground to a predetermined particle size to provide a suitable substrate which is susceptible to the method of the invention. In this connection, the maximum particle size of the ground whole wheat should be less than the minimum dimension of the aperture through which the dough is extruded to provide the expanded wheat product of the invention. Various shapes of apertures may be used, such as slots, circular or oblong holes, crescents, stars, and combinations thereof.

As previously stated, the maximum particle size of the ground wheat material for a slot aperture should be no greater than the minimum dimension of such aperture. This corresponds approximately to a requirement that all of the ground wheat material pass through a #30 mesh screen, U.S. standard sieve size. It has been determined, however, that up to about 20 percent of the ground wheat particles can be greater than #30 mesh screen, but no particle can be greater than the minimum dimension of the aperture. The particle size is believed to affect the generation of heat in the die to cause the heat to form the steam. The whole wheat is preferably ground in a pulverizing type grinder, such as a hammermill provided with a screening device so that the maximum particle size is controlled during the grind operation.

The ground whole wheat is then mixed with any dry ingredients which are to be used. Blending in a ribbon blender or other type dry blending device is suitable for uniformly distributing the dry ingredients in the ground material.

A dough then is prepared by mixing the blend of ground wheat and any other dry ingredients with water and/or a moisture containing product. The moisture and/or moisture containing ingredient are added at a level sufficient to provide a dough containing about 14 percent to about 18 percent by weight of water. The level of moisture is important in relation to the development of heat in the die and to the achievement of desired expansions.

The dough then is introduced into an apparatus capable of forcing the dough through the die at sufficient rate to generate heat and cause steam to form in the dough. Such device may be a press or an extruder. Desirably, the apparatus will be capable of mixing and cooling the dough, while forcing it through the die. In this connection, it is convenient that the apparatus have a body or barrel section to effect mixing of the dough with a screw, auger, or the like. The apparatus should have a head or nozzle section just ahead of the die to conduct the dough from the body or barrel to the die. No heating of the dough in the body or barrel is required. This provides energy savings and avoids heating the dough to high temperatures for longer periods of time which could cause undesired protein denaturation and initiate browning due to a Mallard reaction. Cooking of the dough in the body or barrel is not necessary and is to be minimized. However, the generation of steam in the die inherently causes some heating of the dough ahead of the die and cooling in this region is desirable to avoid significant cooking in the body or barrel. The heat generated during cooking in the die can require the temperature to be controlled such as with a water cooling jacket or the like around the body or barrel. Such cooling should control the temperature range of dough entering the die to between about ambient temperature and about 180° F.

By primarily effecting heating and cooking of the dough in the die, improved control of the process of the invention is achieved. Likewise, the die design can be selected with definite characteristics to accomplish the desired results.

To achieve the temperatures required for cooking of the dough and effecting the desired conditioning of the gluten, steam is not introduced into the extruder and, as pointed out, preheating of the dough ahead of the die is to be avoided. Rather the dough in passing through the die generates heat sufficient to form steam and cook the dough enough to condition the gluten so that upon extrusion the dough expands in a desired form as determined by the die configuration.

The invention represents a significant and unexpected change in concept from the prior art which teaches cooking and conditioning of dough products and then extruding of the dough so that the die is merely a former. There is no disclosure of using the die to generate heat and cook the dough while passing therethrough.

Figure 1:
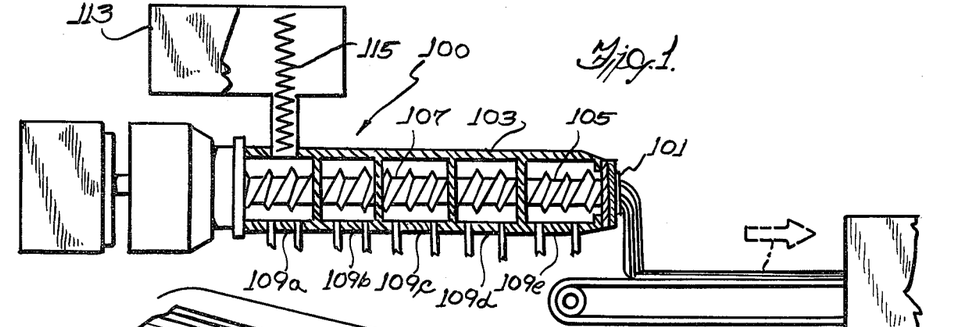
FIG. 1 is a diagrammatic side elevation of an extruder which may be utilized in carrying out this invention.

Turning now to the drawings, various aspects of the present invention will be discussed with reference to the extrusion apparatus illustrated in FIG. 1. Illustrated in FIG. 1 is an extruder 100 which may be a Wenger extruder sold by Wenger Manufacturing, Sabetha, Kansas. The illustrated extruder 100 primarily functions to force dough through a die 101 of particular design and construction to be hereinafter described.

The extruder 100 comprises a barrel or body 103 in which is an auger 105 including auger sections 107 which form a continuous flight. Five jacketed sections 109a, b, c, d and e are arranged along the barrel 103 which terminates in a conical head 109e. The conical head 109e connects to the die 101. In accordance with conventional practice, the screw flights may be in different forms and may be changed to obtain desired results.

The wheat dough is placed in a feed hopper 113 from which it is metered into the barrel 103 with the positive feed auger 115.

In the barrel 103, the auger 105 primarily functions as a pump to force the dough through the die 101 at sufficient rate to generate heat and form steam in the die whereby the dough is cooked and the gluten conditioned. Inherently, the generated heat and steam are directed back into the barrel resulting in some heating prior to the dough reaching the die. Such heating of the dough can be detrimental and is minimized by means for conducting cooling water through one or more of the jacketed sections 109a, b, c, d or e. The auger 105 in addition to its pumping action also functions to more uniformly distribute the ingredients including the moisture throughout the dough.

It should be noted that the illustrated apparatus is but one means for forcing the dough through the die. A hydraulic ram and a positive pump may be used to effect the desired rate of flow through the die to achieve the heat generation and steam formation.

As the dough emerges from the die 101, steam flashes from the product and the product expands, resulting in a product having a moisture content of about 8 percent to about 9 percent by weight.

In the die, the steam is superheated and reaches a temperature of about 250° F. Friction generates the heat and it is apparent that the character of the dough, the configuration of the die and the rate of throughput are functional to the generation of heat.

The dough should be at such pressure at the die 101 to not only achieve the desired heat generation but to provide economical throughputs. Extrusion rates are dependent upon the die configuration and pressure developed at the die 101.

It has been determined that a die 101 having three consecutive disc shaped plates each being drilled and tapped at their periphery for mounting with one another and upon an extruder and each plate having an upstream and downstream face is preferred in the preparation of the product of the invention such product having the shape of a flat open ended cylinder. The first plate has a plurality of equally spaced holes arranged in a circular configuration with each hole being surrounded by a circular feed cavity in the downstream face of the first plate, the entire circular configuration of holes and associated feed cavities terminating within a shallow circular recess in the downstream face of the first plate. The downstream face of the first or upstream plate interfaces with the upstream face of the second or intermediate plate which has a plurality of holes therein. The upstream face of the intermediate plate has a circular boss extending therefrom to actually interface with the downstream face of the upstream plate. The intermediate plate has a plurality of equally spaced groups of a plurality of equally spaced holes. These groups of holes are arranged in a circular configuration. The holes of each of the groups also are in a circular arrangement, this circular arrangement surrounding the holes of the first plate when the plates are aligned. The holes in the intermediate plate extend through the plate and terminate in circular cavities which extend around each circular arrangement on the downstream face of the intermediate plate. The downstream face of the intermediate plate has pegs extending away from the intermediate plate into a plurality of equally spaced holes in the third and final downstream plate from which the product exits the die and is expanded. The pegs are arranged in a circular configuration, are equally spaced and are substantially at the center of each of the circular hole arrangements in the intermediate plate.

The third or downstream plate interfaces with the downstream face of the intermediate plate. The equally spaced holes of the downstream plate are larger at the interface with the intermediate plate than at the area from which extruded product exits. This creates an interior area in the downstream plate which has a shape which is substantially a frustrum. With the pegs of the intermediate plate extending into the center of the holes of the downstream plate, a generally ring-like exit area is formed at the downstream face of the downstream plate from which product is extruded.

Another preferred die is made of two disc shaped plates. The first or upstream plate has an upstream and downstream face and has a plurality equally spaced holes arranged in a circular configuration. The upstream face of the upstream plate has a circular boss extending therefrom to facilitate mounting the plate to an extruder. The downstream face of the first or upstream plate also has a circular cavity or recess which interfaces with the upstream face of the second or downstream plate of the die and a plurality of slots which extend through such downstream plate. The equally spaced slots in the downstream plate are arranged in a circular configuration with the center of the slots lying on a circumference which is slightly outside the center of the holes in the upstream plate. The slots are wider on the upstream face of the downstream plate, than at the extrusion aperture on the downstream face of the downstream plate from which product is extruded. In a particularly preferred form for making a curled product, such as a pork curl type product, the sidewall of the slot interior to the center of the plate forms an angle of about 30° with an axis extending through the slot perpendicular to the upstream and downstream faces of the plates of the die. The sidewall of the slot exterior to the center of the plate forms an angle of about 15° with the axis extending through the slot perpendicular to the upstream and downstream faces of the plates of the die.

In the preferred embodiments of the invention, the extruder 100 may be provided with the two or three plate die shown in FIGS. 2 through 7.

Figure 5:
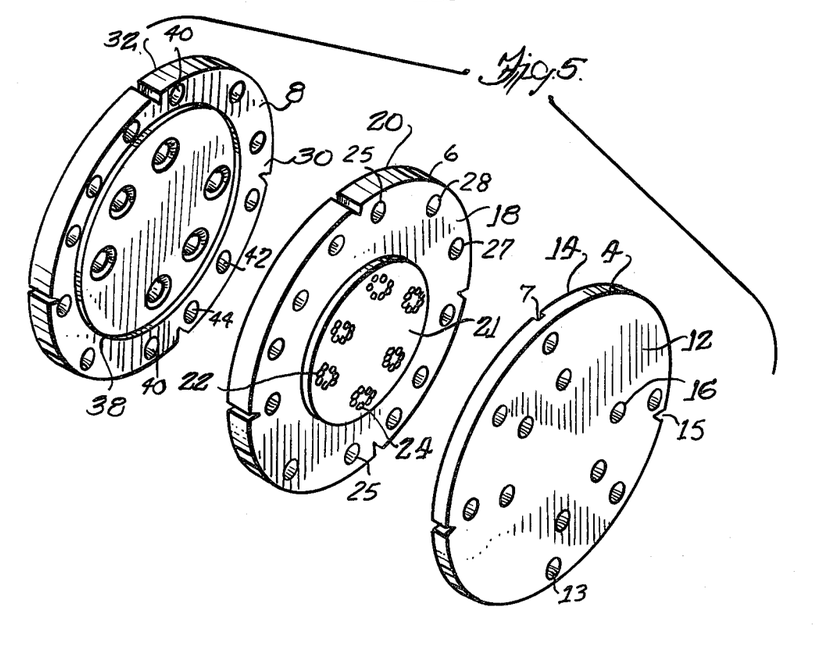
FIG. 5 is an exploded perspective of a three plate extruding die which may be utilized in carrying out this invention.
Figure 6:
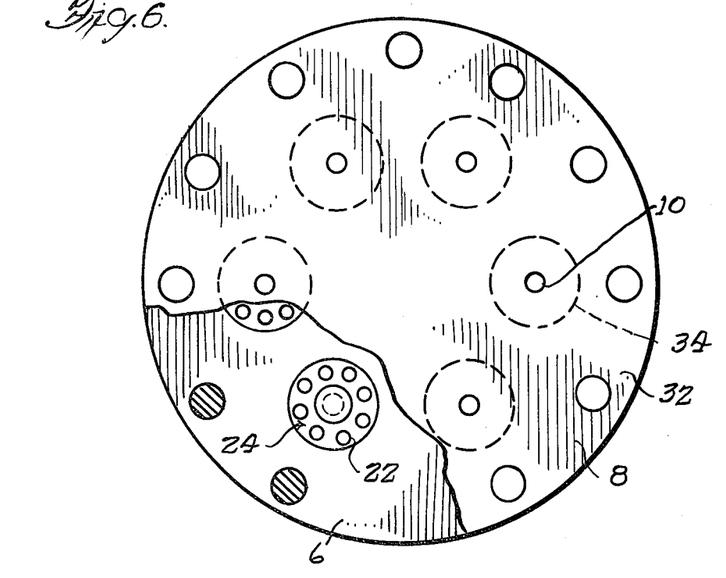
FIG. 6 is an end elevation of a three plate extruding die with portions broken away which may be utilized in carrying out this invention.
Figure 7:
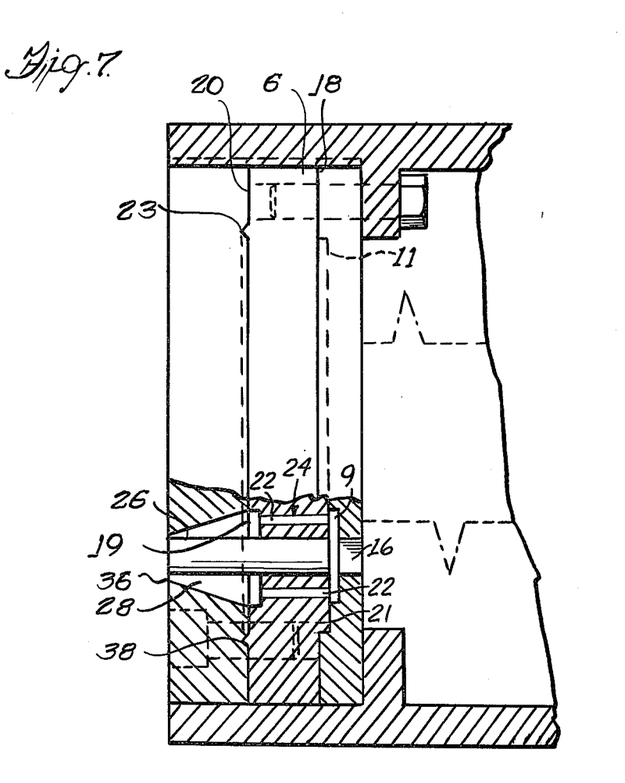
FIG. 7 is a side elevation of a three plate extruding die with portions broken away which may be utilized in carrying out this invention.

Referring to FIGS. 5 through 7, the three plate die comprises three circular or disc shaped plates, upstream plate 4, intermediate plate 6, and downstream plate 8 with dough flowing through plate 4, then plate 6, finally through plate 8 and the die apertures 10 therein. As the product emerges from the die aperture it expands, moisture flashes therefrom, and the product is cut into small, flat, open ended bite size cylinders.

Upstream plate 4 has an upstream face 12, a downstream face 14 and a plurality of holes 16 extending therebetween. The holes 16 are equally spaced at about 60° in a circular configuration which generally has the same center as the center of the disc shaped plate. Downstream face 14 has a generally circular recess 11 having a diameter which exceeds the diameter of the circular configuration of holes 16. Further, on the downstream face of plate 4, each hole also is surrounded by a circular feed cavity 9.

The upstream plate also has holes 13, every 60° mounted on the periphery of the plate. The peripherial edge of the upstream plate has an alignment knotch 15 extending the width of the plate as well as side knotches 7 which extend to about one quarter into the width of the plate.

The intermediate plate 6 generally has about the same width and diameter as the upstream plate. The intermediate plate has an upstream face 18 which is opposed and interfaces with the downstream face of the upstream plate, and a downstream face 20. A plurality equally spaced holes 22 extend through the plate. Holes 22 are in a plurality of circular arrays 24, each such array having a center which is opposed to the center of holes 16 in the upstream plate.

The upstream face of the intermediate plate includes circular intermediate boss 21 extending therefrom, the boss having a circumference lying outside the circular arrays of holes 22. The downstream face of the intermediate plate has a circular bead 23 extending therefrom, the bead having a circumference with a diameter that is substantially equal to the diameter of the boss on the upstream face. Cylindrical pegs 26 extend from the downstream face of the intermediate plate at the center of each circular array. The pegs extend toward the downstream plate 8 and into aperture die holes 28 therein. On the downstream face of the intermediate plate, each peg is surrounded by a circular feed cavity 19 to facilitate extrusion of the dough through to the downstream plate.

The periphery of the intermediate plate has two circular dismount cavities 25, four equally spaced tapped alignment holes 27, and six equally spaced through mount holes 28. The circular dismount cavities are round holes which are not drilled the width of the plate, tapped holes 27 are tapped for a bolt or the like to hold the downstream plate to the intermediate plate.

Downstream plate 8 generally has the same width and diameter as the upstream and intermediate plates. The downstream plate has an upstream face 30 and downstream face 32 with tapered die aperture holes 10 extending therebetween. The upstream face of downstream plate 6 has a circular knotch 38 which is a fitment for bead 23 on the intermediate plate. The six die aperture holes are equally spaced in a circular configuration with the holes 10 having centers on the same axis as holes 16 in the upstream plate, and the centers of the sides or ends of pegs 26. Each die aperture 10 has a larger circular intake aperture 34 than circular exit port 36 such that the volume therebetween in the downstream plate has the shape of a frustrum. The periphery of the downstream plate has two tapped holes 40, four equally spaced through holes 42 and six equally spaced through mount holes 44.

When the plates are assembled in an extruder and the downstream face of the upstream plate is opposed to and interfaces with the boss on the upstream face of the intermediate plate. The longitudinal axes of the pegs of the intermediate plate lie on the same line as the axes extending through the centers of holes 16 in the upstream plate. The downstream face of the intermediate plate is opposed to and interfaces with the upstream face of the downstream plate. The pegs extend into the die apertures of the downstream plate, the ends of the pegs lying in the same plane as the circular exit port of the downstream plate forming a narrow ring like exit port in the die. The bead on the downstream face of the intermediate plate fits into the circular knotch on the upstream face of the downstream plate. Tapped holes 40 in the downstream plate are aligned with circular dismount cavities 25 in the intermediate plate. Through holes 42 in the downstream plate are aligned with tapped alignment holes 27 in the intermediate plate which hold the downstream plate and intermediate plate together with a bolt or the like. Through mount holes 44 in the downstream plate are aligned with untapped mount holes 28 in the intermediate plate, and mounting holes 13 in the upstream plate, all of which are adapted to receive a bolt or the like to extend through such holes and hold the aligned plates on an extruder device.

Figure 2:
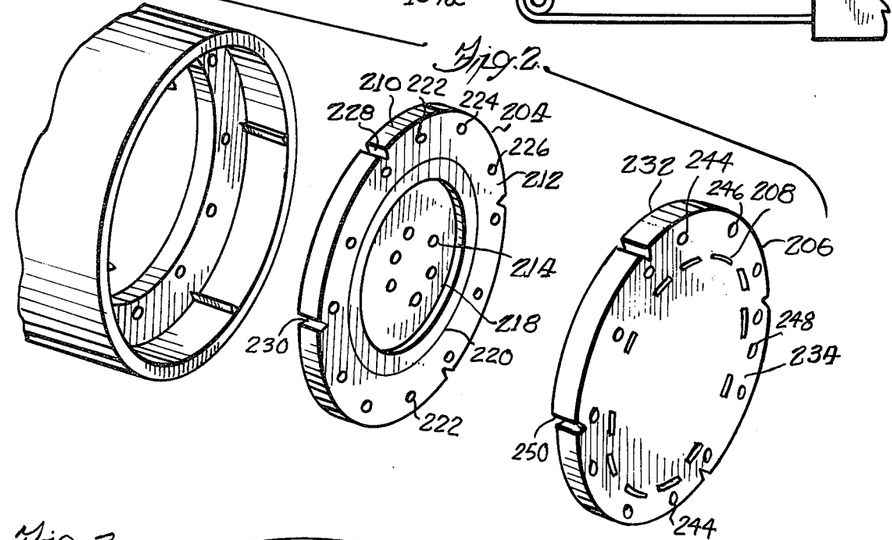
FIG. 2 is an exploded perspective of a two plate extruding die which may be utilized in carrying out this invention.
Figure 3:
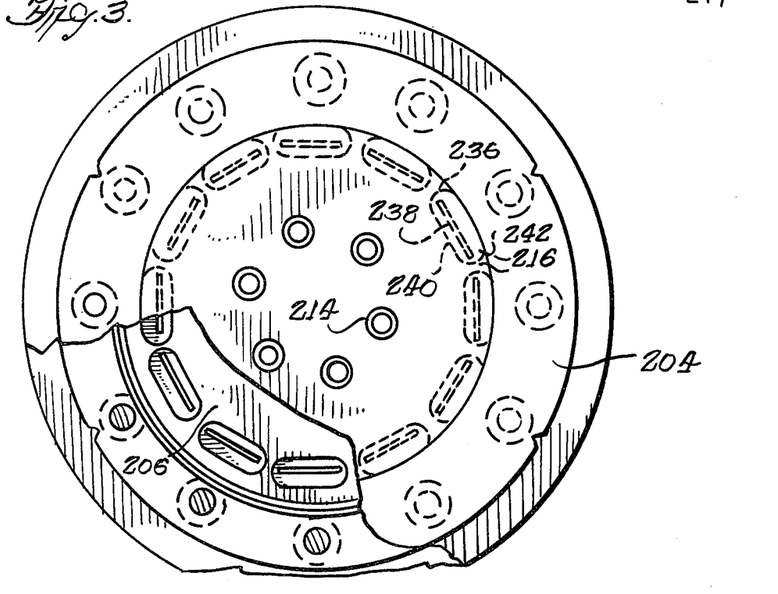
FIG. 3 is an end elevation of a two plate extruding die with portions broken away which may be utilized in carrying out this invention.
Figure 4:
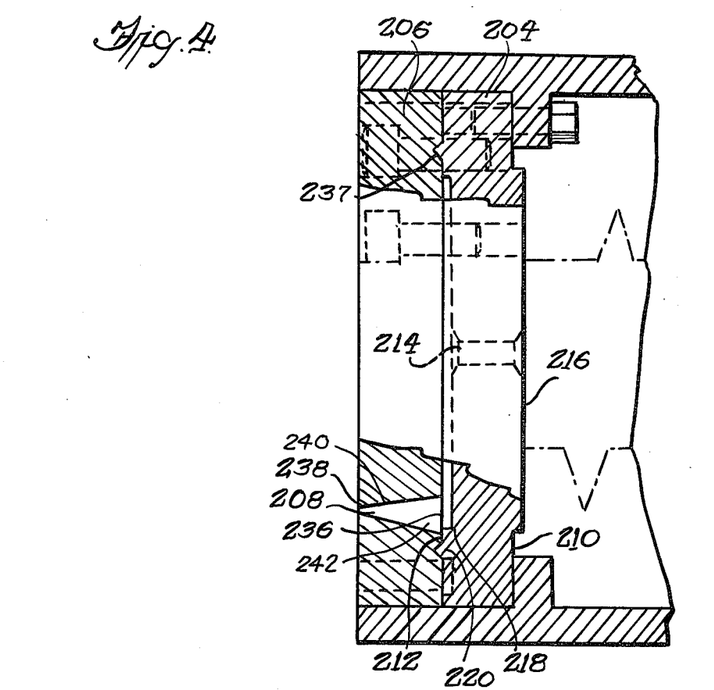
FIG. 4 is a side elevation of a two plate extruding die with portions broken away which may be utilized in carrying out this invention.

Referring to FIGS. 2,3 and 4, a two plate die is an alternate embodiment which may be used in the process of the invention. In the two plate embodiment, the plates are arranged such that a curled product similar to a pork curl is produced.

The two plate die comprises two circular or disc shaped plates, upstream plate 204 and downstream plate 206 with dough flowing through the upstream plate then through the downstream plate and the die aperture slots 208 therein during extrusion. As with the three plate die, as the product emerges from the die aperture slots, it expands moisture flashes therefrom, but because of the shape of the die aperture slot, the product curls as it exits the aperture and is cut into bite size pieces.

Upstream plate 204 has an upstream face 210, a downstream face 212 and a plurality of holes 214 extending therebetween. The holes 214 are equally spaced in a circular configuration which generally has the same center as the center of the disc shaped plate.

The upstream face has a circular disc shape boss 216 extending therefrom which assists in mounting the plate on the extruder, the diameter of the boss being about 70% of the diamenter of the plate. Downstream face 210 of plate 204 has a generally circular cavity 218 having a diameter which exceeds the diamenter of the circular configuration of holes 214, the diameter of the cavity being substantially the same as the diameter of the boss. The downstream face of plate 204 has a circular bead 220 which extends around the cavity 218 and is a fitment to engage the upstream face of the downstream plate. The periphery of the upstream plate has two circular dismount cavities 222 opposed to one another, four tapped holes 224 at about 30° to each side and on the same circumference as the mount cavities 222, and six through mount holes 226 on the same circumference as the mount cavities and tapped holes. Each through mount hole is 30° from each combination of mount cavity and tapped holes. The side of the peripheral edge of the upstream plate has two disassembling knotches 228 which are 60° apart to aid in disassembling the die and dismounting it from the extruder. The peripheral edge of the upstream plate also has two alignment knotches 330 which are 180° apart which aid in aligning the plates with one another as well as proper mounting in the extruder device.

The downstream plate 206 has substantially the same width and diameter as the upstream plate. The downstream plate has an upstream face 232 and a downstream face 234 with die aperture slots, extending therebetween. The upstream face 232 of the downstream plate has a circular knotch 237 which surrounds the die aperature slots and is a fitment for bead 220 on the upstream plate. The die aperature slots are in a generally circular configuration the center of which lies on the same axis as the center of the circular configuration of holes 214 in the upstream plate. The slots, however, are located on a general circumference having a diameter less than the diameter of cavity 218 in the upstream plate.

Each die aperture slot has a larger intake aperture 236 than exit port 238. The angle of the interior wall 240 of the die aperture slot, as measured from an axis perpendicular to the upstream and downstream faces of the downstream plate, extending to the center of the plate is greater than the angle of the exterior wall 242 which extends slightly away from the center of the downstream plate. As a result, dough which is extruded from the two plate die curls upon leaving the exit port 238.

The periphery of the downstream plate has two upstream tapped holes 244 which are 180° opposed, and four through fastner holes 246 which are on the same circumference and are about 30° to each side of the upstream tapped holes 244. About 30° to each side of a tapped hole and two fastener hole combination, plate fastner holes 248 extend through the upstream plate the centers of the plate fastner holes being on the same circumference as the tapped holes and through fastener holes. Further, each side of the peripheral edge of the downstream plate has two alignment knotches 250 for alignment with the knotches 230 of the upstream plate and to assist in mounting the die into an extruder device.

When the two plate die is assembled in an extruder, the downstream face of the upstream plate is opposed to and interfaces with the upstream face of the downstream plate. The circumference of the cavity extends around beyond the exterior walls of the slots in the downstream plate. The upstream plate interfaces with the downstream plate such that the holes in the upstream plate lie at ends of two adjacent slots, each hole essentially supplying two slots with dough. When the plates aligned for mounting into the extruder, the two upstream tapped holes 244 in the downstream plate are aligned with the two circular mount cavities in the upstream plate. The plate fastener holes 248 in the downstream plate are aligned with the tapped holes 224 in the upstream plate to accommodate a bolt or the like to hold the plates in interfacing arrangement. The through fastener holes 246 in the downstream plate are aligned with the plate fastener holes in the upstream plate to accommodate a bolt or the like which will engage the extruder device and hold the plates therein.

After the product is extruded from the die 101, expanded and cut into pieces, the product is dried to a moisture level of less than about 5 percent, but preferably to a moisture level of from about 1 to about 4 percent. Drying is effected at such a rate as to avoid case hardening of the wheat product and, in general, is accomplished in a period of from about 3 to about 15 minutes.

After drying, the expanded wheat product has the following composition on a dry basis when an edible acid and extrusion aid are used in the invention: ground wheat, 75 to 97 percent; edible acid 0.01 to 0.05 percent equivalent lactic acid based on the weight of the wheat fat, 0.04 to 3 percent based on the weight of the wheat and other ingredients, 0 to 25 percent based on the weight of the wheat.

The product can be eaten in this condition, but it is desirably coated with a flavor containing fat to give added flavor and eating characteristics. The two-step coating process results in providing highly desirable flavor release properties and also results in retention of the desired expanded structure.

The following examples further illustrate various features of the invention, but is intended to in no way limit the scope of the invention which is defined in the appended claims.

EXAMPLE I (PORK CURLS)

A hard winter wheat is ground in a hammermill using a #30 mesh screen. 431 pounds of the ground wheat was introduced into a blender. 44 pounds of yeast, 4.4 pounds of powdered yogurt, 3 pounds of corn oil, 11 pounds of skim milk and 40 to 50 pounds of water were added and uniformly mixed and dispersed in the ground wheat to provide a dough. The following flavoring and coloring ingredients were then blended into the dough: 4 pounds catalina seasoning (mixed spices and herbs), 200 grams turmeric, 16 grams onion powder and 5 grams garlic powder.

The dough was introduced into a model X-25 Wenger extruder manufactured by Wenger Manufacturing of Sabetha, Kansas. The length of the barrel of the extruder was divided into five sections each section being provided with a cooling jacket. The barrel had a diameter of 5.25 inches and had a length of 48.6 inches, the barrel terminating with an extrusion die. The barrel was fitted with an auger.

At the end of the barrel was a conical head having a diameter of 5.25 inches at its receiving end and a diameter of 4.25 inches at its discharge end, the length of the orifice being 8.75 inches. A two die plate was mounted at the outlet of the orifice.

Each of the plates had a radius of about $2\frac{1}{8}$ inches. The upstream plate has a thickness of about 0.850 inch, the downstream plate had a thickness of about 0.918 inch. The upstream plate had six holes with a diameter of $\frac{1}{4}$ inch. These holes were equaly spaced in a circular configuration center of which is at the center of the upstream plate, the diameter of the configuration being 1.625 inch. The cavity in the downstream face of the upstream plate had a diameter of about 4 inches and a depth of 0.076 inch, the boss on the upstream face of the upstream plate had a diameter of 4 inches and a heighth of $\frac{1}{8}$ inch.

The downstream plate had 12 narrow rectangular slots having a length at the exit port of about 0.6875 inch and a width at the exit port of about 0.020 inch. The width of the slot at the intake aperture on the upstream face of the downstream plate was about $\frac{3}{8}$ inch the length was about 1 1/16 inch with the ends of the intake aperture being rounded to a 3/16 inch radius. The centers of each of the slots on the downstream face of the plate were on a circumference with its center at the center of the plate, the circumference having a radius of about 1.750 inch. As measured from an axis perpendicular to the upstream and downstream faces of the upstream plate, the interior wall of the die aperture angled toward the center of the upstream face of the downstream plate at an angle of about 30°. As measured from the same axis, the angle of the exterior wall of the die aperture angled away from the center of the downstream plate at an angle of about 15°.

Dough was positively conveyed through the barrel of the extruder with the auger at a rate of 1,000 pounds per hour. The dough was at and remained at about ambient temperature in the first two sections of the barrel. Sections 3, 4 and 5 of the barrel were cooled such that the dough remained at about ambient temperature in the third section of the barrel, the temperature of the dough was slightly above room temperature in the fourth section of the barrel and the fifth section which preceded the conical nozzle was maintained at 150° F. to about 180° F. The dough spent about 4 seconds in the extruder, with the dough being in the die for less than one second.

During the passage of the dough through the plates of the die, the surface of the die reached a temperature of about 180° F., and the dough reached a temperature of about 250° F.

The product curled as it exited from the die and was cut to form a curled wheat product. The moisture of the expanded wheat product leaving the extruder was about 9 percent. The product was introduced into a dryer and was dried to a moisture of 2 percent by weight in about 10 minutes.

EXAMPLE II (RING-LIKE WHEAT PRODUCT)

The ingredients and procedure used in Example I were used to produce a ring-like wheat product.

The dough was introduced into a model X-25 Wenger extruder as described in Example I. The extruder was fitted with a three plate die as generally previously described. The upstream plate had a width or thickness of $\frac{1}{2}$ inch, the intermediate plate had a width or thickness of 0.850 inch, and the downstream plate had a width of 0.918 inch. The upstream plate had 6 equally spaced $\frac{1}{4}$ inch feed holes on a circumference having a diameter of 3 inches surrounded by a circular feed cavity of a diameter of 3 inches and a depth of 0.076 inch. All of the holes terminated on the upstream face in a circular recess having a radius of 2 5/32 inches and a depth of 0.125 inch.

The boss extending from the upstream face of the intermediate face had a radius of 2.125 inches and a height of 0.125 inch. The pegs extending from the downstream face had a diameter of 0.44 inch and length of 1.268 inch. Eight 5/32 inch holes surrounded the pegs and were arranged on a circumference with a diameter of $\frac{3}{4}$ inch. The circular feed cavity surrounding the pegs had a diameter of 1 inch and a depth of 0.076 inch.

The downstream plate had six die aperture holes arranged on a circumference with a 1.5 inch radius. The intake aperture of each of the holes had a 1 inch diameter. The downstream outlet for downstream plate of the die had a diameter of 0.50 inch. With the peg extending into the die aperture, the die had an extrusion aperture or orifice of 0.030 inch.

The dough was uniformly mixed, blended and fed into the extruder as described in Example I. The barrel of the extruder was cooled with the dough being maintained in the barrel and die at the times and temperatures described in Example I. Upon extrusion from the die, the product was cut into a ring-like or cylindrical product which was dried to a moisture of 2 percent in about 10 minutes.

This invention is not to be construed as limited to the exact details of operation or to the compositions described as examples since obvious modifications will be apparent to those skilled in the art.

Accordingly, it will be appreciated that in accordance with the present invention, improved methods for the manufacture of expanded wheat products have been provided. While the present invention has been described with specificity with respect to particular embodiments, various modifications and adaptations thereof will become apparent based on the present disclosure, and are intended to be within the spirit and scope of the present invention.

Various features of the present invention are set forth in the following claims.

What is claimed is:

1. A method for preparing an expanded wheat product comprising the steps of grinding whole wheat, adding moisture to the ground wheat, uniformly distributing the moisture in the ground wheat to make a dough, conducting the dough to a die, heating the dough by passing it through the die at a rate sufficient to generate heat and steam in the dough without any external heat source to the die and cook the dough in the die to condition the wheat and extruding the dough into a lower pressure zone to flash steam and expand the dough.

2. A method as recited in claim 1, wherein said wheat has at least 11 percent protein.

3. A method as recited in claim 1, wherein said dough has from about 14 percent to about 18 percent by weight moisture.

4. A method as recited in claim 1, wherein said dough is extruded at a rate of about 1,000 pounds per hour.

5. A method as recited in claim 1, wherein said lower pressure zone is at about atmospheric pressure.

6. A method as recited in claim 1, wherein said wheat has a particle size no greater than the minimum dimension of said die.

7. A method as recited in claim 1, wherein said dough is extruded into said lower pressure zone forming an expanded product which has the shape of a pork curl.

8. A method as recited in claim 1 wherein the die comprises three interfacing plates which include an upstream plate, an intermediate plate and a downstream plate each with an upstream and downstream face, said dough being extruded in the downstream direction;

the upstream plate including a plurality of upstream plate apertures each of the upstream apertures being surrounded by a feed cavity in the downstream face of the upstream plate, the plurality of upstream plate apertures terminating in a recess in the downstream face of the upstream plate;

the intermediate plate having a plurality of intermediate apertures in a plurality of intermediate arrays each of the arrays having a center which is substantially opposed to the center of the upstream plate apertures, the upstream face of the intermediate plate having an intermediate boss extending therefrom interfacing with the downstream face of the upstream plate, the intermediate apertures extending through the intermediate boss, the downstream face of the intermediate plate having a bead and a plurality of pegs extending therefrom, the pegs extending substantially from the center of each of the intermediate arrays and each of the pegs being surrounded by an intermediate feed cavity;

the downstream plate having a plurality of downstream apertures tapering down into openings in the downstream face of the downstream plate, the pegs extending from the intermediate plate into the downstream apertures forming an exit port in the die between the pegs and the downstream apertures.

9. A method as recited in claim 8 wherein said dough has from about 14 percent to about 18 percent by weight moisture and is extruded at a rate of about 1000 pounds per hour.

10. A method as recited in claim 1 wherein said die comprises two interfacing plates which include an upstream plate and a downstream plate each with an upstream and a downstream face, said dough being extruded in the downstream direction;

the upstream plate including a plurality of upstream apertures, the upstream apertures being surrounded by a feed cavity in the downstream face of the upstream plate;

the downstream plate having a plurality of downstream apertures offset from the upstream apertures, the downstream apertures tapering down to the downstream face of the downstream plate forming an exit port in the die.

11. A method as recited in claim 10 wherein the downstream apertures are slots offset on a circumference surrounding the upstream apertures.

12. A method as recited in claim 8 wherein said dough has from about 14 percent to about 18 percent by weight moisture and is extruded at a rate of about 1000 pounds per hour.

13. A method as recited in claims 1, 2, 3, 4, 5 6, 8 or 10 wherein said heat and steam are generated in said dough and said dough is cooked in said die without any external heat source to said dough and said die.

* * * * *

UNITED STATES PATENT AND TRADEMARK OFFICE
CERTIFICATE OF CORRECTION

PATENT NO. : 4,438,146
DATED : March 20, 1984
INVENTOR(S) : Colby, et al.

It is certified that error appears in the above-identified patent and that said Letters Patent is hereby corrected as shown below:

In the Abstract, line 1, "producers" should read --products--.

Column 7, line 24, after "plurality" insert --of--.

Column 8, line 4, "peripherial" should read --peripheral--.

Column 8, line 13, after "plurality" insert --of--.

Column 9, line 38, "diamenter" should read --diameter--.

Column 9, line 40, "diamenter" should read --diameter--.

Column 9, lines 67 and 68, "aperature" should read --aperture--.

Column 9, line 68, "aperature" should read --aperture--.

Column 10, line 17, "fastner" should read --fastener--.

Column 10, line 21, "fastner" should read --fastener--.

Column 10, line 22, "fastner" should read --fastener--.

Column 11, line 37, "equaly" should read --equally--.

Column 11, line 43, "heighth" should read --height--.

UNITED STATES PATENT AND TRADEMARK OFFICE
CERTIFICATE OF CORRECTION

PATENT NO. : 4,438,146
DATED : March 20, 1984
INVENTOR(S) : Ronald W. Colby et al.

It is certified that error appears in the above-identified patent and that said Letters Patent is hereby corrected as shown below:

Column 11, line 50, " 1 1/16" should read --1 3/16--.

Column 14, line 43, after "5" insert a comma (,).

Signed and Sealed this

Twenty-third Day of April 1985

[SEAL]

Attest:

DONALD J. QUIGG

Attesting Officer     Acting Commissioner of Patents and Trademarks